(12) United States Patent
Pitchai Muthu et al.

(10) Patent No.: US 11,900,074 B2
(45) Date of Patent: Feb. 13, 2024

(54) METHOD AND APPARATUS FOR IMPLEMENTING AN END-TO-END API DESIGN AND DEVELOPMENT MODULE INTEGRATING WITH FIRMWIDE TOOLS AND PROCESSES

(71) Applicant: JPMorgan Chase Bank, N.A., New York, NY (US)

(72) Inventors: Shivani Pitchai Muthu, Bangalore (IN); Pritam Prasad, Bengaluru (IN); Aruna Kalagnanam, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 181 days.

(21) Appl. No.: 17/445,534

(22) Filed: Aug. 20, 2021

(65) Prior Publication Data

US 2022/0057999 A1 Feb. 24, 2022

Related U.S. Application Data

(60) Provisional application No. 63/087,504, filed on Oct. 5, 2020.

(30) Foreign Application Priority Data

Aug. 20, 2020 (IN) .............................. 202011035859

(51) Int. Cl.
*G06F 8/10* (2018.01)
*G06F 8/38* (2018.01)
*G06F 8/41* (2018.01)

(52) U.S. Cl.
CPC .................. *G06F 8/10* (2013.01); *G06F 8/38* (2013.01); *G06F 8/436* (2013.01)

(58) Field of Classification Search
CPC ....................................................... G06F 8/10
(Continued)

(56) References Cited

U.S. PATENT DOCUMENTS 9,836,339 B1 * 12/2017 Engers .................. G06F 9/4484
10,180,836 B1 * 1/2019 Arguelles .................. G06F 8/75
(Continued)

FOREIGN PATENT DOCUMENTS

CN 115686747 A * 2/2023
WO WO-2018020448 A1 * 2/2018 ............... G06F 8/20

OTHER PUBLICATIONS

CN-115686747-A Text Translation.*
(Continued)

*Primary Examiner* — Francisco J Aponte
(74) *Attorney, Agent, or Firm* — GREENBLUM & BERNSTEIN, P.L.C.

(57) ABSTRACT

Various methods, apparatuses/systems, and media for implementing an API design and development module are disclosed. A receiver receives inputs for designing a specification. Codes are generated from the API specification and necessary business logic is added. A processor pushes the specification along with the code to a source control which automatically triggers a continuous integration/continuous deployment (CI/CD) pipeline in response to pushing of the specification along with the code to the source control. The CI/CD pipeline automatically executes, through pre-defined configuration, each phase of an API development life cycle to develop the API based on the designed specification.

15 Claims, 5 Drawing Sheets

(58) Field of Classification Search
USPC .......................................................... 717/104
See application file for complete search history.

(56) References Cited

U.S. PATENT DOCUMENTS

| | | | | |
|---|---|---|---|---|
| 10,303,586 | B1* | 5/2019 | Falko | G06F 11/3636 |
| 10,331,422 | B1* | 6/2019 | Russell | G06F 8/36 |
| 10,356,155 | B2* | 7/2019 | Tiwari | H04L 67/10 |
| 10,572,370 | B2* | 2/2020 | Bahrami | G06F 11/3684 |
| 10,635,435 | B2* | 4/2020 | Bahrami | G06F 40/279 |
| 10,866,788 | B2* | 12/2020 | Reddy | G06F 9/54 |
| 11,074,068 | B1* | 7/2021 | Bogushefsky, III | G06F 9/45504 |
| 11,137,998 | B2* | 10/2021 | Liu | G06F 8/71 |
| 11,150,874 | B2* | 10/2021 | Lester | G06F 16/903 |
| 11,163,620 | B2* | 11/2021 | Liu | G06N 20/00 |
| 11,269,694 | B2* | 3/2022 | Aspro | G06F 8/10 |
| 11,537,367 | B1* | 12/2022 | Bhattacharyya | G06F 8/60 |
| 11,748,686 | B1* | 9/2023 | Kwan | G06F 9/541 705/7.27 |
| 2016/0308900 | A1* | 10/2016 | Sadika | H04L 63/1441 |
| 2017/0371937 | A1* | 12/2017 | Shah | G06F 8/71 |
| 2018/0196643 | A1* | 7/2018 | Dolby | H04L 67/025 |
| 2018/0314622 | A1* | 11/2018 | Lowe | G06F 11/3616 |
| 2018/0321993 | A1* | 11/2018 | McClory | H04L 41/5041 |
| 2019/0272169 | A1* | 9/2019 | Russell | G06F 8/30 |
| 2020/0012785 | A1* | 1/2020 | Dykes | G06F 21/552 |
| 2020/0167215 | A1* | 5/2020 | Sidhu | H04L 67/53 |
| 2020/0218588 | A1* | 7/2020 | Sarid | G06F 8/30 |
| 2020/0301763 | A1* | 9/2020 | Chandoor | G06F 16/93 |
| 2020/0322324 | A1* | 10/2020 | Chang | G06F 9/54 |
| 2020/0389543 | A1* | 12/2020 | Swope | H04L 67/53 |
| 2021/0124576 | A1* | 4/2021 | Gungabeesoon | G06F 8/38 |
| 2021/0182131 | A1* | 6/2021 | Reuzel | G06F 16/9566 |
| 2021/0208865 | A1* | 7/2021 | Stylos | G06F 8/65 |
| 2021/0224062 | A1* | 7/2021 | Baldassarre | G06F 8/30 |
| 2022/0206880 | A1* | 6/2022 | Thota | G06F 9/541 |
| 2022/0283929 | A1* | 9/2022 | Singh | G06F 9/541 |
| 2023/0055940 | A1* | 2/2023 | Dasari | G06F 16/215 |
| 2023/0092752 | A1* | 3/2023 | Balbi | G06F 8/36 717/140 |
| 2023/0093370 | A1* | 3/2023 | Battaglia | G06F 8/65 717/170 |
| 2023/0161693 | A1* | 5/2023 | Herington | G06F 11/3684 717/124 |
| 2023/0229546 | A1* | 7/2023 | Goad | G06F 9/54 714/33 |

OTHER PUBLICATIONS

Maryela Weihrauch et al. "Integrating Db2 for z/OS Database Changes Into a CI/CD Pipeline"; IBM Redpaper, Information Management—Aug. 2021.*

Joonas Saarenpää "Creating an Azure CI/CD pipeline for a React web application"; Laurea University of Applied Sciences—Dec. 2020.*

* cited by examiner

METHOD AND APPARATUS FOR IMPLEMENTING AN END-TO-END API DESIGN AND DEVELOPMENT MODULE INTEGRATING WITH FIRMWIDE TOOLS AND PROCESSES

CROSS-REFERENCE TO RELATED APPLICATIONS

This application claims the benefit of priority from U.S. Provisional Patent Application No. 63/087,504, filed Oct. 5, 2020, which is herein incorporated by reference in its entirety. This application also claims the benefit of priority from Indian Provisional Patent Application No. 202011035859, filed Aug. 20, 2020, which is herein incorporated by reference in its entirety.

TECHNICAL FIELD

This disclosure generally relates to application programming interface (API) development, and, more particularly, to methods and apparatuses for implementing an API design and development module for designing, prototyping, and developing APIs in a stream-lined manner integrated with the software development lifecycle (SDLC), thereby improving efficiency and productivity in designing and developing APIs.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, across the multiple lines of businesses (LOB) at an organization, rapid growth in the number of APIs developed demands a managed approach for the API delivery and adoption processes. The following problems are among some of the problems associated with current API development approach: not all developed APIs within an organization are discoverable; not all developed APIs are in adherence to firm-wide API standards implemented by an organization; under-utilization of the API management platforms available; lack of awareness about the API ecosystem; no automation in API development lifecycle, and is driven by the developer manually, thereby reducing developer's productivity; developer requires knowledge to leverage all API development tools; manual process checks to ensure API quality; design doesn't drive code—code and design are not in sync; late consumer feedback, etc.

For example, in today's typical API development lifecycle, developer manually requests access to each API tool available within the firm, to perform a specific function which requires specific knowledge to leverage these tools. For example, to develop an API, a developer may first utilize an IDE to develop APIs. Then, the developer manually pushes the code to a version control system. According to the conventional method, design is usually not version controlled—only source code would be version controlled. After pushing code to the version control system, according to conventional method, the developer may utilize yet other various distinct tools and may manually request access to each of them separately to complete a specific function for the API. Once the code is pushed, the developer might need to trigger a pipeline manually or the hook could trigger the pipeline automatically, According to this conventional technique, only code would be tested for input and output. There is no contract that is established and tested for the API design till now. Thus, design may not be in sync with the code. The developer might choose to export the API design from the code, but this is optional. Then, the developer may utilize another tool, e.g., an API validator, to validate the API design with standards, semantics, and data dictionary across the firm. The developer may then utilize another separate tool, e.g., an API gateway, to expose the API. Similarly, the developer may continue to utilize separate tools for pushing the design to a firm-wide API inventory to make the API discoverable; onboarding to the firms' security system to secure the APIs (security function appearing very late in the SDLC, thereby giving rise to code changes again); deploying API and exposing the same to the consumer; working on consumer feedback (consumer not involved until now, thereby again requiring code changes to incorporate feedback); and updating code (only code may be updated, design may not be updated, thereby resulting asynchronous design and code). These manual conventional processes in the API development lifecycle may prove to be time consuming and inefficient.

Moreover, as API development in conventional approach is not strictly integrated with the SDLC, it may become difficult to enforce a systematic approach towards API delivery.

SUMMARY

The present disclosure, through one or more of its various aspects, embodiments, and/or specific features or sub-components, may provide, among others, various systems, servers, devices, methods, media, programs, and platforms for implementing an API design and development module for designing, prototyping, and developing APIs in a stream-lined manner integrated with the software development lifecycle (SDLC), thereby improving efficiency and productivity in developing APIs, but the disclosure is not limited thereto. The present disclosure, through one or more of its various aspects, embodiments, and/or specific features or sub-components, may also provide, among others, various systems, servers, devices, methods, media, programs, and platforms for implementing an API design and development module that may provide a way to figure out any changes to a project which might break any existing API consumers in an automated way, but the disclosure is not limited thereto.

According to an aspect of the present disclosure, a method for implementing an API design and development module by utilizing one or more processors and one or more memories is disclosed. The method may include: designing an API specification; generating code from the API specification and adding business logic; pushing the specification along with the code to a source control which automatically triggers a continuous integration/continuous deployment (CI/CD) pipeline in response to pushing of the specification along with the code to the source control, wherein the CI/CD pipeline is configured to automatically execute, through pre-defined configuration, each phase of an API development life cycle to deploy and expose the API based on the designed specification.

According to another aspect of the present disclosure, wherein the CI/CD pipeline may be configured to automatically execute the following phases of the API development life cycle that may include: validating the specification against a firm-wide predefined standards and semantics implemented by an organization; seamlessly onboarding to an API gateway with predefined set of configurations; publishing the API to a firm-wide API inventory to enable consumers to discover the published API; exposing test scripts to a consumer for testing the API to ensure that a contract associated with the API is not violated; deploying the API; and verifying security of the deployed API against the designed specification, but the disclosure is not limited thereto.

According to a further aspect of the present disclosure, wherein in validating the specification, the method may further include: receiving a result of validation of the specification; and tagging any non-conformance as a build failure.

According to an additional aspect of the present disclosure, wherein in seamlessly onboarding to the API gateway, the method may further include driving any desired custom configurations from the code.

According to an aspect of the present disclosure, the method may further include comparing the published API with existing APIs stored in the API inventory to manage duplication.

According to further aspect of the present disclosure, the method may further include: receiving a result of verifying security; and rolling back deployment of the API when the result shows a violation of security against the designed specification.

According to yet another aspect of the present disclosure, the method may further include: enabling secured, self-contained functions to automatically trigger the CI/CD pipeline.

According to yet another aspect of the present disclosure, a system for implementing end to end API design and development module is disclosed. The system may include additional tool to design API specification and generate code for all languages from the specification itself. The code generation module may be configured to ideally generate model and interfaces for the specification and allow a developer to implement the interfaces and key in the business logic. The framework may be configured to: push the specification along with the code to a source control; and automatically trigger a continuous integration/continuous deployment (CI/CD) pipeline in response to pushing of the specification along with the code to the source control, wherein the CI/CD pipeline is configured to automatically execute, through pre-defined configuration, each phase of an API development life cycle to deploy and expose the API based on the designed specification.

According to another aspect of the present disclosure, wherein the processor may cause the CI/CD pipeline to automatically execute the following phases of the API development life cycle that includes: validating the specification against a firm-wide predefined standards and semantics implemented by an organization; seamlessly onboarding to an API gateway with predefined set of configurations; publishing the API to a firm-wide API inventory to enable consumers to discover the published API; exposing test scripts to a consumer for testing the API to ensure that a contract associated with the API is not violated; deploying the API; and verifying security of the deployed API against the designed specification, but the disclosure is not limited thereto.

According to yet another aspect of the present disclosure, wherein in validating the specification, the processor may be further configured to: receive a result of validation of the specification; and tag any non-conformance as a build failure.

According to another aspect of the present disclosure, wherein in seamlessly onboarding to the API gateway, the processor may be further configured to drive any desired custom configurations from the code.

According to an aspect of the present disclosure, the processor may be further configured to compare the published API with existing APIs stored in the API inventory to manage duplication.

According to further aspect of the present disclosure, the processor may be further configured to: receive a result of verifying security; and roll back deployment of the API when the result shows a violation of security against the designed specification.

According to yet another aspect of the present disclosure, the processor may be further configured to: enable secured, self-contained functions to automatically trigger the CI/CD pipeline.

According to a further aspect of the present disclosure, a non-transitory computer readable medium configured to store instructions for implementing API design and development module is disclosed. The instructions, when executed, may cause a processor to perform the following: receiving inputs for designing an API specification; generating code from the API specification and adding business logic; and pushing the specification along with the code to a source control which automatically triggers a continuous integration/continuous deployment (CI/CD) pipeline in response to pushing of the specification along with the code to the source control, wherein the CI/CD pipeline is configured to automatically execute, through pre-defined configuration, each phase of an API development life cycle to deploy and expose the API based on the designed specification.

According to another aspect of the present disclosure, wherein, when executed, the instructions may further cause the processor to cause the CI/CD pipeline to automatically execute the following phases of the API development life cycle that includes: validating the specification against a firm-wide predefined standards and semantics implemented by an organization; seamlessly onboarding to an API gateway with predefined set of configurations; publishing the API to a firm-wide API inventory to enable consumers to discover the published API; exposing test scripts to a consumer for testing the API to ensure that a contract associated with the API is not violated; deploying the API; and verifying security of the deployed API against the designed specification, but the disclosure is not limited thereto.

According to yet another aspect of the present disclosure, wherein in validating the specification, the instructions, when executed, may further cause the processor to: receive a result of validation of the specification; and tag any non-conformance as a build failure.

According to another aspect of the present disclosure, wherein in seamlessly onboarding to the API gateway, the instructions, when executed, may further cause the processor to drive any desired custom configurations from the code.

According to an aspect of the present disclosure, the instructions, when executed, may further cause the processor to compare the published API with existing APIs stored in the API inventory to manage duplication.

According to further aspect of the present disclosure, the instructions, when executed, may further cause the processor to: receive a result of verifying security; and roll back deployment of the API when the result shows a violation of security against the designed specification.

According to yet another aspect of the present disclosure, the instructions, when executed, may further cause the processor to: enable secured, self-contained functions to automatically trigger the CI/CD pipeline.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
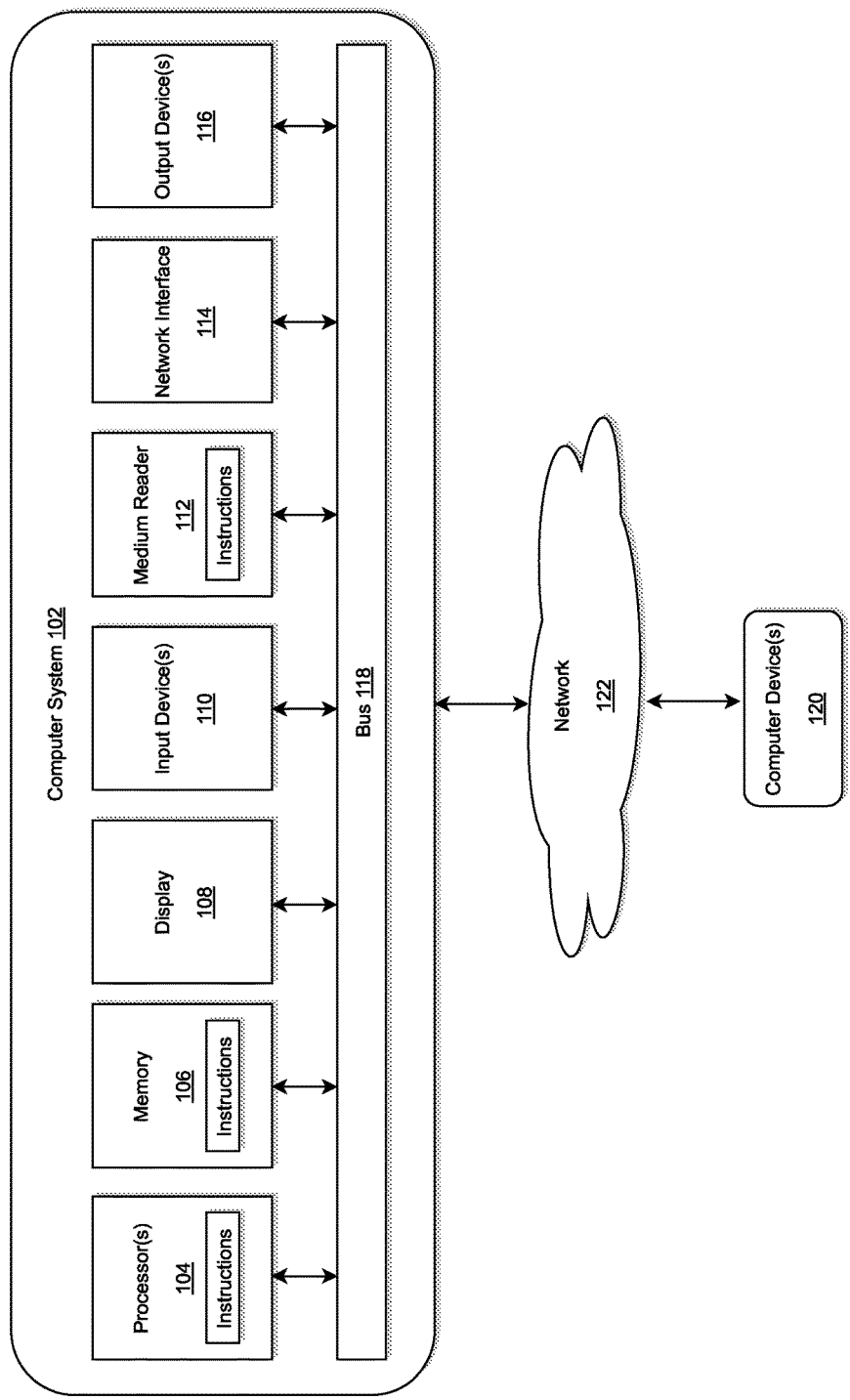
FIG. 1 illustrates a computer system for implementing an API design and development module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing an API design and development module for designing, prototyping, and developing APIs in a stream-lined manner integrated with a software development lifecycle (SDLC), thereby improving efficiency and productivity in developing APIs, but the disclosure is not limited thereto.

Figure 2:
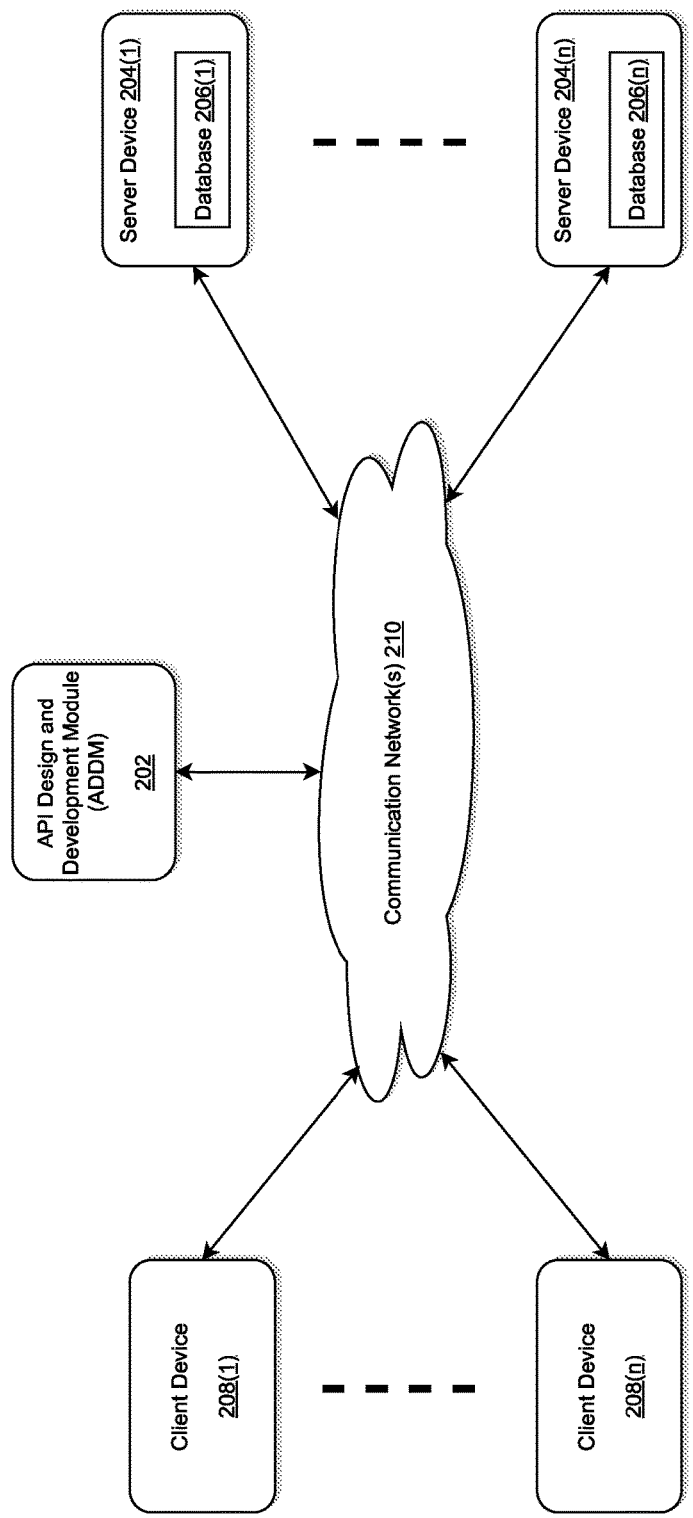
FIG. 2 illustrates an exemplary network diagram of an API design and development module in accordance with an exemplary embodiment.

Referring to FIG. 2, a schematic of an exemplary network environment 200 for implementing an API design and development module (ADDM) of the instant disclosure is illustrated.

According to exemplary embodiments, the above-described problems associated with conventional system may be overcome by implementing an ADDM 202 as illustrated in FIG. 2 to design, prototype, and develop APIs in a stream-lined manner integrated with a software development lifecycle (SDLC), thereby improving efficiency and productivity in developing APIs, but the disclosure is not limited thereto. In addition, according to exemplary embodiments, the above-described problems associated with conventional system may be overcome by implementing an ADDM 202 having a stage as illustrated in FIG. 2 to allow figuring out any changes to a project which might break any existing API consumers in an automated way, but the disclosure is not limited thereto.

The ADDM 202 may be the same or similar to the computer system 102 as described with respect to FIG. 1.

The ADDM 202 may store one or more applications that can include executable instructions that, when executed by the ADDM 202, cause the ADDM 202 to perform actions, such as to transmit, receive, or otherwise process network messages, for example, and to perform other actions described and illustrated below with reference to the figures. The application(s) may be implemented as modules or components of other applications. Further, the application(s) can be implemented as extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADDM 202 itself, may be located in virtual server(s) running in a cloud-based computing environment rather than being tied to one or more specific physical network computing devices. Also, the application(s) may be running in one or more virtual machines (VMs) executing on the ADDM 202. Additionally, in one or more embodiments of this technology, virtual machine(s) running on the ADDM 202 may be managed or supervised by a hypervisor.

In the network environment 200 of FIG. 2, the ACD 202 is coupled to a plurality of server devices 204(1)-204(n) that hosts a plurality of databases 206(1)-206(n), and also to a plurality of client devices 208(1)-208(n) via communication network(s) 210. A communication interface of the ADDM 202, such as the network interface 114 of the computer system 102 of FIG. 1, operatively couples and communicates between the ADDM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADDM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADDM 202 may be a standalone device or integrated with one or more other devices or apparatuses, such as one or more of the server devices 204(1)-204(n), for example. In one particular example, the ADDM 202 may be hosted by one of the server devices 204(1)-204(n), and other arrangements are also possible. Moreover, one or more of the devices of the ADDM 202 may be hosted in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADDM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ADDM 202 that may provide a way to figuring out any changes to a project which might break any existing API consumers in an automated way, but the disclosure is not limited thereto.

Accordingly, the client devices 208(1)-208(n) may be mobile computing devices, desktop computing devices, laptop computing devices, tablet computing devices, virtual machines (including cloud-based computers), for example.

The client devices 208(1)-208(n) may run interface applications, such as standard web browsers or standalone client applications, which may provide an interface to communicate with the ADDM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ADDM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADDM 202, the server devices 204(1)-204(n), or the client devices 208(1)-208(n), for example, may be configured to operate as virtual instances on the same physical machine. For example, one or more of the ADDM 202, the server devices 204(1)-204(n), or the client devices 208(1)-208(n) may operate on the same physical device rather than as separate devices communicating through communication network(s) 210. Additionally, there may be more or fewer ADDM 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
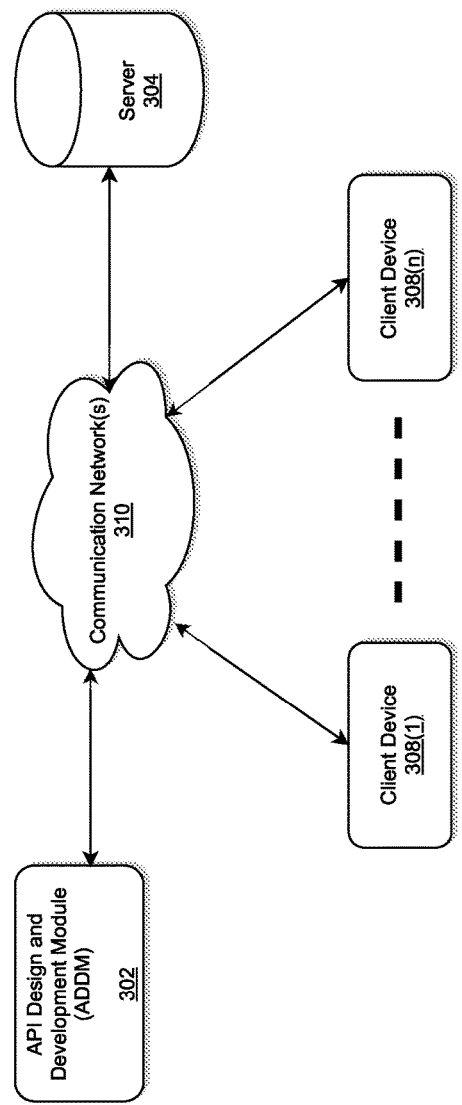
FIG. 3 illustrates a system diagram for implementing an API design and development module in accordance with an exemplary embodiment.

FIG. 3 illustrates a system diagram for implementing an ADDM in accordance with an exemplary embodiment. According to exemplary embodiments, the ADDM may be implemented locally and the local ADDM may include tools to ease the process of API design and development aided through various design and development tools available locally to the developer.

As illustrated in FIG. 3, in the system 300, according to exemplary embodiments, the ADDM 302 may be connected to a server 304 via a communication network 310, but the disclosure is not limited thereto. For example, according to exemplary embodiments, the ADDM 302 may be connected to any desired databases besides the server 304.

According to exemplary embodiments, the server 304 may include memories that may store source codes and components associated with an application, but the disclosure is not limited thereto.

According to exemplary embodiment, the ADDM 302 may include other rules, policies, modules, databases, or applications, for example. According to exemplary embodiments, the server 304 may be configured to store information including the metadata, but the disclosure is not limited thereto. According to exemplary embodiments, ADDM 302 may contain multiple stages connecting to various other tools to perform the required processes According to exemplary embodiments, the ADDM 302 may be configured to receive continuous feed of data from the server 304 via the communication network 310. According to exemplary embodiments, the ADDM 302 may also be configured to communicate with the client devices 308(1)-308(n) (e.g., user's devices) via the communication network 310, but the disclosure is not limited thereto. According to exemplary embodiments, the client devices 308(1)-308(n) may also be referred to as developer's systems.

As will be described below, the ADDM 302 may be configured to receive inputs for designing an API specification; generating code from the API specification and adding business logic; and push the specification along with the code to a source control which automatically triggers a continuous integration/continuous deployment (CI/CD) pipeline in response to pushing of the specification along with the code to the source control, wherein the CI/CD pipeline may be configured to automatically execute, through pre-defined configuration, each phase of an API development life cycle to deploy and expose the API based on the designed specification, but the disclosure is not limited thereto.

For example, according to exemplary embodiments, the ADDM 302 may be CI/CD pipeline that may be configured to solve the problems associated conventional processes of API development by: streamlining the API development processes with development frameworks such as Spring Boot Framework, OpenAPI Specification (OAS), etc.; improving developer productivity by providing a kick-start to API development through open source Code-Generation Services; providing an interface to integrate an API ecosystem with most of the SDLC phases; providing early quality checks using custom validations and by integrating with API validator (i.e., firm-wide service that measures the quality of APIs), but the disclosure is not limited thereto.

According to exemplary embodiments, the ADDM 302 may be a tooling system that may be configured to solve the problems associated conventional processes of API development by providing a framework for faster marketing for developed APIs; rapid code development through an open source code generation service; and improving API maturity due to left shift quality checks, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the ADDM 302 via broadband or cellular communication. Of course, these embodiments are merely exemplary and are not limiting or exhaustive.

Figure 4:
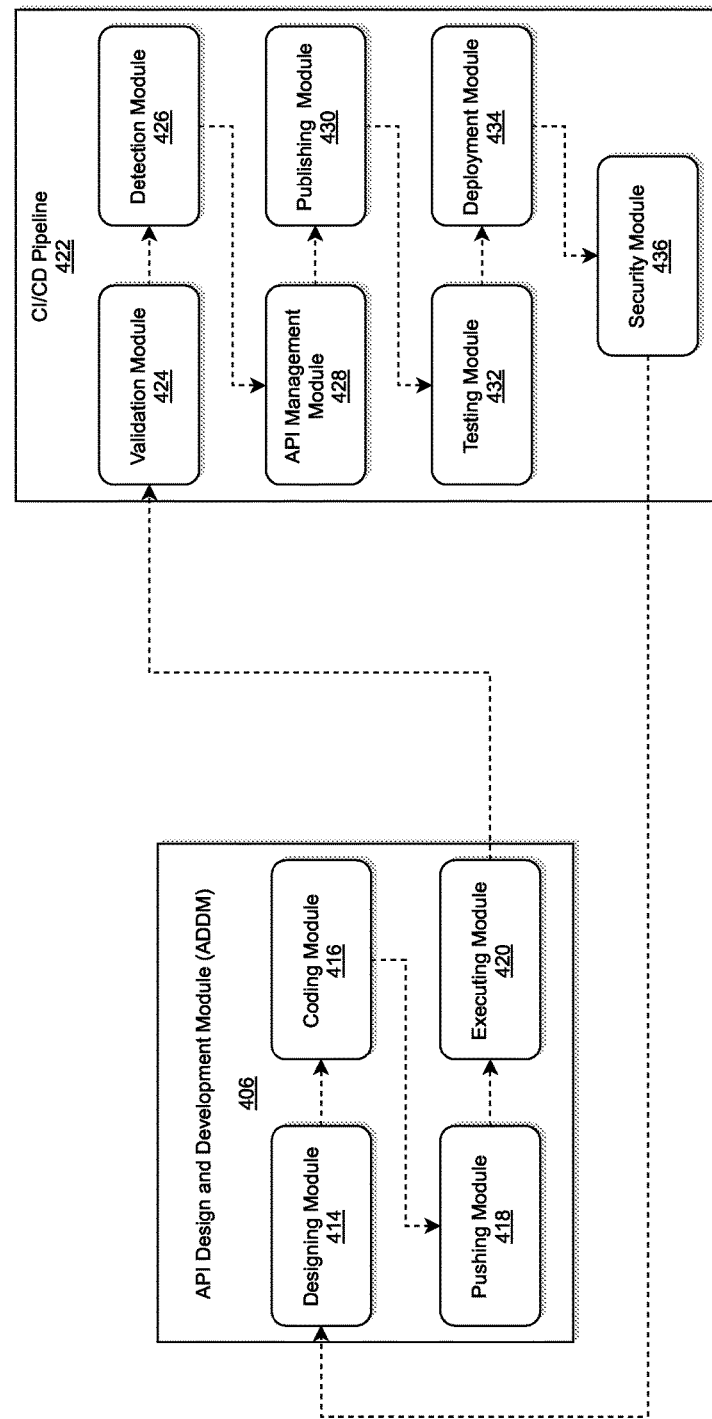
FIG. 4 illustrates a system diagram for implementing the API design and development lifecycle of FIG. 3 in accordance with an exemplary embodiment.

FIG. 4 illustrates a system diagram for implementing a local API design and development module of FIG. 3 in accordance with an exemplary embodiment. As illustrated in FIG. 4, the system 400 may include a local API design and development module (ADDM) 406 which may include tools to ease the process of API design and development aided through various design and development tools available locally to the developer, and a CI/CD pipeline 422. Referring to FIGS. 3 and 4, the local ADDM 406 and the CI/CD pipeline 422 may be connected to each other via the communication network 310. Hereinafter, the local ADDM 406 may be simply referred to as ADDM 406.

As illustrated in FIG. 4, the ADDM 406 may include a designing module 414, a coding module 416, a pushing module 418, and an executing module 420. As illustrated in FIG. 4, the CI/CD pipeline 422 may include a validation module 424, a detection module 426, an API management module 428, a publishing module 430, a testing module 432, a deployment module 434, and a security module 436.

Referring again to FIGS. 3 and 4, the process may be executed via the communication network 310 which may comprise plural networks as described above. For example, in an exemplary embodiment, the various components of the ADDM 406 may communicate with the various components of the CI/CD pipeline 422 via the communication network 310. Of course, these embodiments are merely exemplary and are not limiting or exhaustive.

According to exemplary embodiments, each of the designing module 414, coding module 416, pushing module 418, executing module 420, validation module 424, detection module 426, API management module 428, a publishing module 430, a testing module 432, a deployment module 434 and the security module 436 may be implemented by microprocessors or similar, they may be programmed using software (e.g., microcode) to perform various functions discussed herein. Alternatively, each of the designing module 414, coding module 416, pushing module 418, executing module 420, validation module 424, detection module 426, API management module 428, a publishing module 430, a testing module 432, a deployment module 434 and the security module 436 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the designing module 414, coding module 416, pushing module 418, executing module 420, validation module 424, detection module 426, API management module 428, a publishing module 430, a testing module 432, a deployment module 434 and the security module 436 may be physically separated into two or more interacting and discrete blocks, units, engines, devices, and/or modules without departing from the scope of the inventive concepts.

According to exemplary embodiments, the designing module 414 may be configured to receive inputs for designing a specification along with code for developing the API. The coding module 416 may be utilized to generate code for the API to support various programming languages APIs and can be exposed through open source platforms. The pushing module 418 may be configured to push the specification along with the code to a source control. According to exemplary embodiments, by utilizing the designing module 414 and the coding module 416, the ADDM 406 may be configured to allow designing first approach with code generation tools to enable faster development; designing to consider security of APIs; and allow a developer to focus only on business logic.

According to exemplary embodiments, by utilizing the pushing module 418, the ADDM 406 may be configured to allow code and specification file to be pushed together and version controlled; designing drives development; and enabling hook to automatically trigger the CI/CD pipeline 422 by the execution module 420.

According to exemplary embodiments, the ADDM 406 may be configured to automatically trigger CI/CD pipeline 422 in response to pushing of the specification along with the code to the source control and the CI/CD pipeline 422 may be configured to automatically execute, without requiring developer's input or with minimal developer input (i.e., through pre-defined configuration), each phase of an API development life cycle to develop the API based on the designed specification.

For example, according to exemplary embodiments, the CI/CD pipeline 422 may be configured to automatically execute the following phases of the API development life cycle, in response to pushing, that may include, but not limited thereto: validating the specification against a firm-wide predefined standards and semantics implemented by an organization; seamlessly onboarding to an API gateway with predefined set of configurations; publishing the API to a firm-wide API inventory to enable consumers to discover the published API; exposing test scripts to a consumer's computing device for testing the API to ensure that a contract associated with the API is not violated; deploying the API; and verifying security of the deployed API against the designed specification.

For example, according to exemplary embodiments, by automatically triggering the CI/CD pipeline 422 by the execution module 420 in response to pushing by the pushing module 418, the validation module 424 may be configured to validate the specification against a firm-wide predefined standards and semantics implemented by an organization; validating of models with the firm's data dictionary accessed from the server 304; and tagging any non-conformance as a build failure. For example, the detection module 426 may be configured to detect breaking changes.

According to exemplary embodiments, by automatically triggering the CI/CD pipeline 422 by the execution module 420 in response to pushing by the pushing module 418, the API management module 428 may be configured to seamlessly onboard to an API gateway with predefined set of configurations and to drive any custom configuration from the code. The publishing module 430 may be configured to publish the API to a firm-wide API inventory to enable consumers to discover the published API easily compared to conventional technique. According to exemplary embodiments, the publishing module 430 may be configured to compare the published API with existing APIs stored in the API inventory to automatically manage duplication.

According to exemplary embodiments, by automatically triggering the CI/CD pipeline 422 by the execution module 420 in response to pushing by the pushing module 418, the testing module 432 may be configured to expose test scripts to a consumer's computing device for testing the API to ensure that a contract associated with the API is not violated. Thus, feedback from consumers may be incorporated from design followed by development.

According to exemplary embodiments, by automatically triggering the CI/CD pipeline 422 by the execution module 420 in response to pushing by the pushing module 418, the deployment module 434 may be configured to deploy the API if all the previous steps disclosed above corresponding to API lifecycle are successful. According to exemplary embodiments, the security module 436 may be configured to verify security of the deployed API against the designed specification. Any violation of security provided by the security module 436 may result in a rollback of the deployment.

According to exemplary embodiments, the ADDM 406 may be configured to enable secured, self-contained functions to automatically trigger the CI/CD pipeline.

Figure 5:
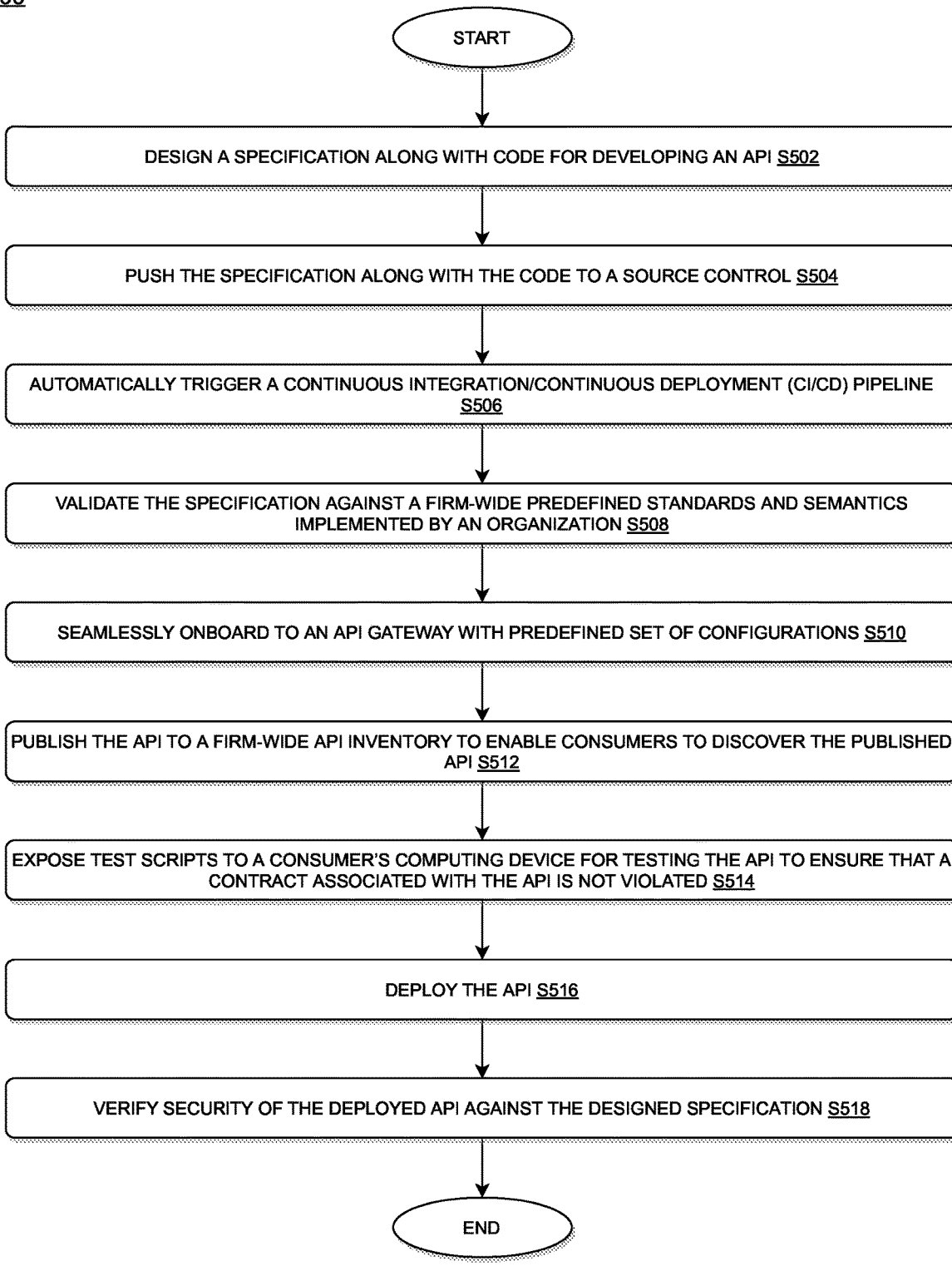
FIG. 5 illustrates a flow chart for implementing an API design and development module in accordance with an exemplary embodiment.

FIG. 5 illustrates a flow chart for implementing an API design and development module in accordance with an exemplary embodiment. It will be appreciated that the illustrated process 500 and associated steps may be performed in a different order, with illustrated steps omitted, with additional steps added, or with a combination of reordered, combined, omitted, or additional steps.

In the process 500 of FIG. 5, at step S502, a specification along with code may be designed for developing an API. At step S504, the specification along with the code may be pushed to a source control. At step S506, a CI/CD pipeline may be automatically triggered in response to pushing of the specification along with the code to the source control and the CI/CD pipeline may be configured to automatically execute, through pre-defined configuration, each phase of an API development life cycle to develop the API based on the designed specification.

According to exemplary embodiments, at step S508, the process 500 may automatically validate the specification against a firm-wide predefined standards and semantics implemented by an organization. At step S510, the process 500 may automatically seamlessly onboard to an API gateway with predefined set of configurations. At step S512, the process 500 may automatically publish the API to a firm-wide API inventory to enable consumers to discover the published API. At step S514, the process 500 may automatically expose test scripts to a consumer's computing device for testing the API to ensure that a contract associated with the API is not violated. At step S516, the process 500 may deploy the API, and at step S518, the process 500 may automatically verify security of the deployed API against the designed specification.

According to exemplary embodiments, in validating the specification, the process 500 may further include: receiving a result of validation of the specification; and tagging any non-conformance as a build failure.

According to exemplary embodiments, wherein in seamlessly onboarding to the API gateway, the process 500 may further include driving any desired custom configurations from the code.

According to exemplary embodiments, the process 500 may further include comparing the published API with existing APIs stored in the API inventory to manage duplication.

According to exemplary embodiments, the process 500 may further include: receiving a result of verifying security; and rolling back deployment of the API when the result shows a violation of security against the designed specification.

According to exemplary embodiments, the process 500 may further include enabling secured, self-contained functions to automatically trigger the CI/CD pipeline.

According to exemplary embodiments, a non-transitory computer readable medium may be configured to store instructions for implementing the ADDM 406, but the disclosure is not limited thereto. According to exemplary embodiments, the instructions, when executed, may cause a processor embedded within the ADDM 406 to perform the following: designing a specification along with code for developing an API; pushing the specification along with the code to a source control; and automatically triggering a continuous integration/continuous deployment (CI/CD) pipeline in response to pushing of the specification along with the code to the source control, wherein the CI/CD pipeline is configured to automatically execute, through pre-defined configuration, each phase of an API development life cycle to develop the API based on the designed specification. The processor may be the same or similar to the processor 104 as illustrated in FIG. 1.

According to exemplary embodiments, the instructions, when executed, may cause the processor 104 to perform the following: validating the specification against a firm-wide predefined standards and semantics implemented by an organization; seamlessly onboarding to an API gateway with predefined set of configurations; publishing the API to a firm-wide API inventory to enable consumers to discover the published API; exposing test scripts to a consumer's computing device for testing the API to ensure that a contract associated with the API is not violated; deploying the API; and verifying security of the deployed API against the designed specification.

According to exemplary embodiments, in validating the specification, the processor 104 embedded within the local API design and development lifecycle to perform the following: receiving a result of validation of the specification; and tagging any non-conformance as a build failure.

According to exemplary embodiments, wherein in seamlessly onboarding to the API gateway, the processor 104 embedded within the local API design and development lifecycle to perform the following: driving any desired custom configurations from the code.

According to exemplary embodiments, the processor 104 embedded within the local API design and development lifecycle to perform the following: comparing the published API with existing APIs stored in the API inventory to manage duplication.

According to exemplary embodiments, the processor 104 embedded within the local API design and development lifecycle to perform the following: receiving a result of verifying security; and rolling back deployment of the API when the result shows a violation of security against the designed specification.

According to exemplary embodiments, the processor 104 embedded within the local API design and development lifecycle to perform the following: enabling secured, self-contained functions to automatically trigger the CI/CD pipeline.

According to exemplary embodiments as disclosed above in FIGS. 1-5, technical improvements effected by the instant disclosure may include platforms for implementing an ADDM for designing, prototyping, and developing APIs in a stream-lined manner integrated with an SDLC, thereby improving efficiency and productivity in developing APIs, but the disclosure is not limited thereto. According to exemplary embodiments as disclosed above in FIGS. 1-5, technical improvements effected by the instant disclosure may further include platforms for implementing an ADDM that provides a platform for figuring out any changes to a project which might break any existing API consumers in an automated way; synchronizing design and code wherein design drives development; providing the developer to focus only on business logic and the remaining processes in the SDLC are automatically triggered and completed by the framework; mandating use of tools that would ensure high API quality and conformance to firm-wide standards; allowing consumer involvement early in the API lifecycle; not allowing API security to be compromised as validation is automatically taken care of by the platform, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an API (application programming interface) design and development module by utilizing one or more processors and one or more memories, the method comprising:
    implementing the API design and development module, that includes a designing module, a coding module, a pushing module, and an executing module, in a manner such that it provides a platform to design, prototype, and develop an API in a stream-lined manner integrated with an API development lifecycle, and to determine any changes to a project in an automated way wherein the changes have capability to break any existing API consumers;
    receiving, by implementing the designing module, inputs for designing an API specification along with code for developing the API specification;
    designing, by implementing the designing module, the API specification;
    generating code, by implementing the coding module, from the API specification and adding business logic to support a plurality of programming languages APIs and exposing through open source platforms, wherein the coding module is configured to allow designing first approach with code generation tools to enable faster development, design to consider security of the APIs; and allow a developer to focus only on business logic;
    pushing, by implementing the pushing module, the specification along with the code to a source control which automatically triggers a continuous integration/continuous deployment (CI/CD) pipeline in response to pushing of the specification along with the code to the source control, wherein the CI/CD pipeline is configured to automatically execute, through pre-defined configuration, each phase of the API development life cycle to develop the API based on the designed specification; and
    enabling hook, by implementing the executing module, to automatically trigger the CI/CD pipeline,
    wherein the CI/CD pipeline is configured to automatically execute the following phases of the API development life cycle that includes:
    validating the specification against a firm-wide predefined standards and semantics implemented by an organization;
    seamlessly onboarding to an API gateway with predefined set of configurations, wherein seamlessly onboarding to the API gateway further comprising driving any desired custom configurations from the code;
    publishing the API to a firm-wide API inventory to enable consumers to discover the published API;
    exposing test scripts to a consumer's computing device for testing the API to ensure that a contract associated with the API is not violated;
    deploying the API; and
    verifying security of the deployed API against the designed specification.

2. The method according to claim 1, wherein validating the specification further comprising:
    receiving a result of validation of the specification; and
    tagging any non-conformance as a build failure.

3. The method according to claim 1, further comprising:
    comparing the published API with existing APIs stored in the API inventory to manage duplication.

4. The method according to claim 1, further comprising:
    receiving a result of verifying security; and
    rolling back deployment of the API when the result shows a violation of security against the designed specification.

5. The method according to claim 1, further comprising:
    enabling secured, self-contained functions to automatically trigger the CI/CD pipeline.

6. A system for implementing an API (application programming interface) design and development module, comprising:
    receiver that receives inputs for designing an API specification; and
    a processor operatively connected to the receiver via a communication network, wherein the processor is configured to:
    implement the API design and development module, that includes a designing module, a coding module, a pushing module, and an executing module, in a manner such that it provides a platform to design, prototype, and develop an API in a stream-lined manner integrated with an API development lifecycle, and to determine any changes to a project in an automated way wherein the changes have capability to break any existing API consumers;
    receive, by implementing the designing module, inputs for designing an API specification along with code for developing the API specification;
    design, by implementing the designing module, the API specification;
    generate code, by implementing the coding module, from the API specification and adding business logic to support a plurality of programming languages APIs and exposie through open source platforms, wherein the coding module is configured to allow designing first approach with code generation tools to enable faster development, design to consider security of the APIs; and allow a developer to focus only on business logic;
    push, by implementing the pushing module, the specification along with the code to a source control which automatically triggers a continuous integration/continuous deployment (CL/CD) pipeline in response to pushing of the specification along with the code to the source control, wherein the CI/CD pipeline is configured to automatically execute, through pre-defined configuration, each phase of the API development life cycle to develop the API based on the designed specification; and
    enable hook, by implementing the executing module, to automatically trigger the CI/CD pipeline,
    wherein the processor causes the CI/CD pipeline to automatically execute the following phases of the API development life cycle that includes:
    validate the specification against a firm-wide predefined standards and semantics implemented by an organization;
    seamlessly onboard to an API gateway with predefined set of configurations, wherein in seamlessly onboarding to the API gateway, the processor is further configured to drive any desired custom configurations from the code;
    publish the API to a firm-wide API inventory to enable consumers to discover the published API;
    expose test scripts to a consumer's computing device for testing the API to ensure that a contract associated with the API is not violated;

deploy the API; and verify security of the deployed API against the designed specification.

7. The system according to claim 6, wherein in validating the specification, the processor is further configured to:
receive a result of validation of the specification; and
tag any non-conformance as a build failure.

8. The system according to claim 6, wherein the processor is further configured to:
compare the published API with existing APIs stored in the API inventory to manage duplication.

9. The system according to claim 6, wherein the processor is further configured to:
receive a result of verifying security; and
roll back deployment of the API when the result shows a violation of security against the designed specification.

10. The system according to claim 6, wherein the processor is further configured to:
enable secured, self-contained functions to automatically trigger the CI/CD pipeline.

11. A non-transitory computer readable medium configured to store instructions for implementing an API (application programming interface) design and development module, wherein, when executed, the instructions cause a processor to perform the following:
implementing the API design and development module, that includes a designing module, a coding module, a pushing module, and an executing module, in a manner such that it provides a platform to design, prototype, and develop an API in a stream-lined manner integrated with an API development lifecycle, and to determine any changes to a project in an automated way wherein the changes have capability to break any existing API consumers;
receiving, by implementing the designing module, inputs for designing an API specification along with code for developing the API specification;
designing, by implementing the designing module, the API specification;
generating code, by implementing the coding module, from the API specification and adding business logic to support a plurality of programming languages APIs and exposing through open source platforms, wherein the coding module is configured to allow designing first approach with code generation tools to enable faster development, design to consider security of the APIs; and allow a developer to focus only on business logic;
pushing, by implementing the pushing module, the specification along with the code to a source control which automatically triggers a continuous integration/continuous deployment (CI/CD) pipeline in response to pushing of the specification along with the code to the source control, wherein the CI/CD pipeline is configured to automatically execute, through pre-defined configuration, each phase of the API development life cycle to develop the API based on the designed specification; and
enabling hook, by implementing the executing module, to automatically trigger the CI/CD pipeline,
wherein, when executed, the instructions further cause the processor to cause the CI/CD pipeline to automatically execute the following phases of the API development life cycle that includes:
validating the specification against a firm-wide predefined standards and semantics implemented by an organization;
seamlessly onboarding to an API gateway with predefined set of configurations, wherein in seamlessly onboarding to the API gateway, the instructions, when executed, further cause the processor to drive any desired custom configurations from the code;
publishing the API to a firm-wide API inventory to enable consumers to discover the published API;
exposing test scripts to a consumer's computing device for testing the API to ensure that a contract associated with the API is not violated;
deploying the API; and
verifying security of the deployed API against the designed specification.

12. The non-transitory computer readable medium according to claim 11, wherein in validating the specification, the instructions, when executed, further cause the processor to:
receive a result of validation of the specification; and
tag any non-conformance as a build failure.

13. The non-transitory computer readable medium according to claim 9, wherein the instructions, when executed, further cause the processor to:
compare the published API with existing APIs stored in the API inventory to manage duplication.

14. The non-transitory computer readable medium according to claim 11, wherein the instructions, when executed, further cause the processor to:
receive a result of verifying security; and
roll back deployment of the API when the result shows a violation of security against the designed specification.

15. The non-transitory computer readable medium according to claim 11, wherein the instructions, when executed, further cause the processor to:
enabling secured, self-contained functions to automatically trigger the CI/CD pipeline.

* * * * *